MICROWAVE RECEIVER AND COMPONENT THEREFOR

Filed Sept. 19, 1969 10 Sheets-Sheet 1

INVENTORS
JAMES W. CRIMMINS
RUSSELL PANKEY
BY Cushman, Darby & Cushman
ATTORNEYS INVENTORS
JAMES W. CRIMMINS
RUSSELL PANKEY
BY Cushman, Darby & Cushman
ATTORNEYS INVENTORS
JAMES W. CRIMMINS
RUSSELL PANKEY
BY Cushman Darby & Cushman
ATTORNEYS

MICROWAVE RECEIVER AND COMPONENT THEREFOR

INVENTORS
JAMES W. CRIMMINS
RUSSELL PANKEY

BY Cushman, Darby & Cushman
ATTORNEYS

MICROWAVE RECEIVER AND COMPONENT THEREFOR

INVENTORS
JAMES W. CRIMMINS
RUSSELL PANKEY

BY Cushman, Darby & Cushman
ATTORNEYS

MICROWAVE RECEIVER AND COMPONENT THEREFOR

Filed Sept. 19, 1969 10 Sheets-Sheet 6

INVENTORS
JAMES W. CRIMMINS
RUSSELL PANKEY

BY Cushman, Darby & Cushman
ATTORNEYS

MICROWAVE RECEIVER AND COMPONENT THEREFOR

Filed Sept. 19, 1969 10 Sheets-Sheet 7

INVENTOR

JAMES W. CRIMMINS
RUSSELL PANKEY

BY Cushman, Darby & Cushman
ATTORNEYS

MICROWAVE RECEIVER AND COMPONENT THEREFOR

Filed Sept. 19, 1969 10 Sheets-Sheet 8

INVENTORS

JAMES W. CRIMMINS
RUSSELL PANKEY

BY Cushman, Darby & Cushman
ATTORNEYS

MICROWAVE RECEIVER AND COMPONENT THEREFOR

Filed Sept. 19, 1969

INVENTORS
JAMES W. CRIMMINS
RUSSELL PANKEY
BY Cushman, Darby & Cushman
ATTORNEYS Jan. 23, 1973 J. W. CRIMMINS ET AL 3,713,038

MICROWAVE RECEIVER AND COMPONENT THEREFOR

Filed Sept. 19, 1969 10 Sheets-Sheet 10

INVENTORS
JAMES W. CRIMMINS
RUSSELL PANKEY
BY Cushman, Darby & Cushman
ATTORNEYS United States Patent Office 3,713,038
Patented Jan. 23, 1973

3,713,038
MICROWAVE RECEIVER AND COMPONENT THEREFOR

James W. Crimmins, 28 Sharp Hill Road, Wilton, Conn. 06897, and Russell Pankey, Carrituck Road, Newtown, Conn. 06470

Filed Sept. 19, 1969, Ser. No. 860,851
Int. Cl. H01p 7/04, 5/04; H03h 13/00
U.S. Cl. 333—82 B 3 Claims

ABSTRACT OF THE DISCLOSURE

A microwave receiver and front end unit including a preselector filter comprised of a plurality of directly coupled cylindrical cavities that are simultaneously tuned to the same frequency by noncontacting conducting elements mounted in the cavities, transverse to the longitudinal axes thereof. In addition, the front end unit includes a mixer circuit to which intercepted R.F. signals and local oscillator power are directly coupled.

BACKGROUND OF THE INVENTION

The invention relates to microwave receivers and, more specifically, to a new front end unit for microwave receivers and receivers incorporating the same.

Many types of microwave receivers include a front end unit which in turn conventionally includes a signal coupling means connected between the antenna terminals and a preselector filter. The filter must be tunable over the entire radio frequency (R.F.) band in which information signals are intercepted by the antenna and conventionally the filter is coupled to a mixer circuit which may be part of the front end unit. A local oscillator source is also coupled to the mixer so that the output signals of the mixer circuit are located within a desired intermediate frequency (I.F.) range. This intermediate range signal is coupled then from the front end unit to an I.F. preamplifier which is the first stage in a conventional I.F. amplification network whose output is coupled to a detection and information retrieval stage, which removes the encoded information and displays or utilizes it in a conventional manner.

Two somewhat conflicting requirements are usually placed on the design of a microwave receiver front end unit, the first being high selectivity of tuning at discrete frequencies in the R.F. band of interest and the second the ability to receive information signals over a wide R.F. band.

In conventional microwave receiver designs, these two requirements are obviously mutually antagonistic. While sharp tuning of discrete information channels can be obtained by the use of inductive and capacitive parameters, such parameters introduce high coupling loss over the whole R.F. band of frequencies that are to be processed by the microwave receiver.

Furthermore, in conventional front end units, the microwave signal is coupled from the preselector filter to the mixer by means of transmission line connections, and these connections produce undesirable mismatching between the preselector filter and the mixer as the filter is tuned over the R.F. band of frequencies to be processed by the receiver.

In addition, conventional front end units are characterized by a high series inductance coupling between the preselector filter and the mixer which varies as the filter is tuned over the R.F. band of interest and introduces an uncompensated for and undesirable parameter.

Furthermore, coupling from the local oscillator source to the mixer, in conventional front end units, is also accomplished by means of transmission line connections. Because of mismatch over the R.F. band, these connections increase the probability of feed-through of the local oscillator power from the mixer to the preselector filter and hence to the antenna terminals. This undesired local oscillator signal feed-through can become a very severe problem when a common antenna is used to feed two or more microwave receivers. Moreover, the use of transmission line coupling to the mixer circuit increases the signal loss during tuning of the filter over the R.F. band of interest.

Many attempts have been made in the past to overcome these problems by appropriate design of the components in a microwave receiver front end unit. For example, step-twist junction filters, which are comprised of a number of rectangular cavities connected directly to each other through circular irises, have been used to avoid some of the problems of transmission line coupling. The cavities in this filter are arranged serially so that the center frequency of the filter is determined by the resonant frequency of the cavities and the pass band characteristics which are determined by the relation of the circular irises. The pass band characteristics can be changed by physical rotation of one or more of the cavities with respect to the others.

However, such junction filters have proved unsatisfactory in several ways. For example, when one cavity section is rotated with respect to another, an adverse current distribution is set up on either side of the common wall between adjacent cavities. Furthermore, it is extremely difficult to provide auxiliary tuning mechanisms to vary the center frequency of the filter because the various sections or cavities of the filter must be physically rotated. Hence, an automatic tuning structure for the purpose of simultaneously tuning two or more of the cavities cannot be easily fabricated, and each cavity must be individually tuned.

SUMMARY OF THE INVENTION

It is a further object of the invention to provide a microwave receiver with a novel front end unit.

Another object of the invention is to provide a novel mechanism for simultaneously tuning a number of resonant cavities which in serial connection comprise a multistage preselector filter in the front end unit of a microwave receiver.

Still another object of the invention is to provide a novel microwave mixer circuit for use in a microwave receiver.

These and other objects are achieved, in accordance with the invention, in a receiver having a front end unit which couples R.F. signals from an antenna to signal utilization means in the receiver, the front end comprising a preselector filter, including at least one cylindrical cavity, a conductor mounted in the cavity transverse to the longitudinal axis of said cavity, a rotatable apertured plate forming a first wall of the cavity for coupling R.F. signals from the antenna into the cavity, a second rotatable apertured plate forming a second wall of the cavity for coupling R.F. signals out of the cavity, and means for tuning the cavity including a movable rod electrically co-operating with the cavity's transverse conductor.

A more complete understanding of the invention may be obtained from the following detailed description of preferred embodiments, reference being made to the drawings.

DESCRIPTION OF EMBODIMENTS

Figures 1, 2A:
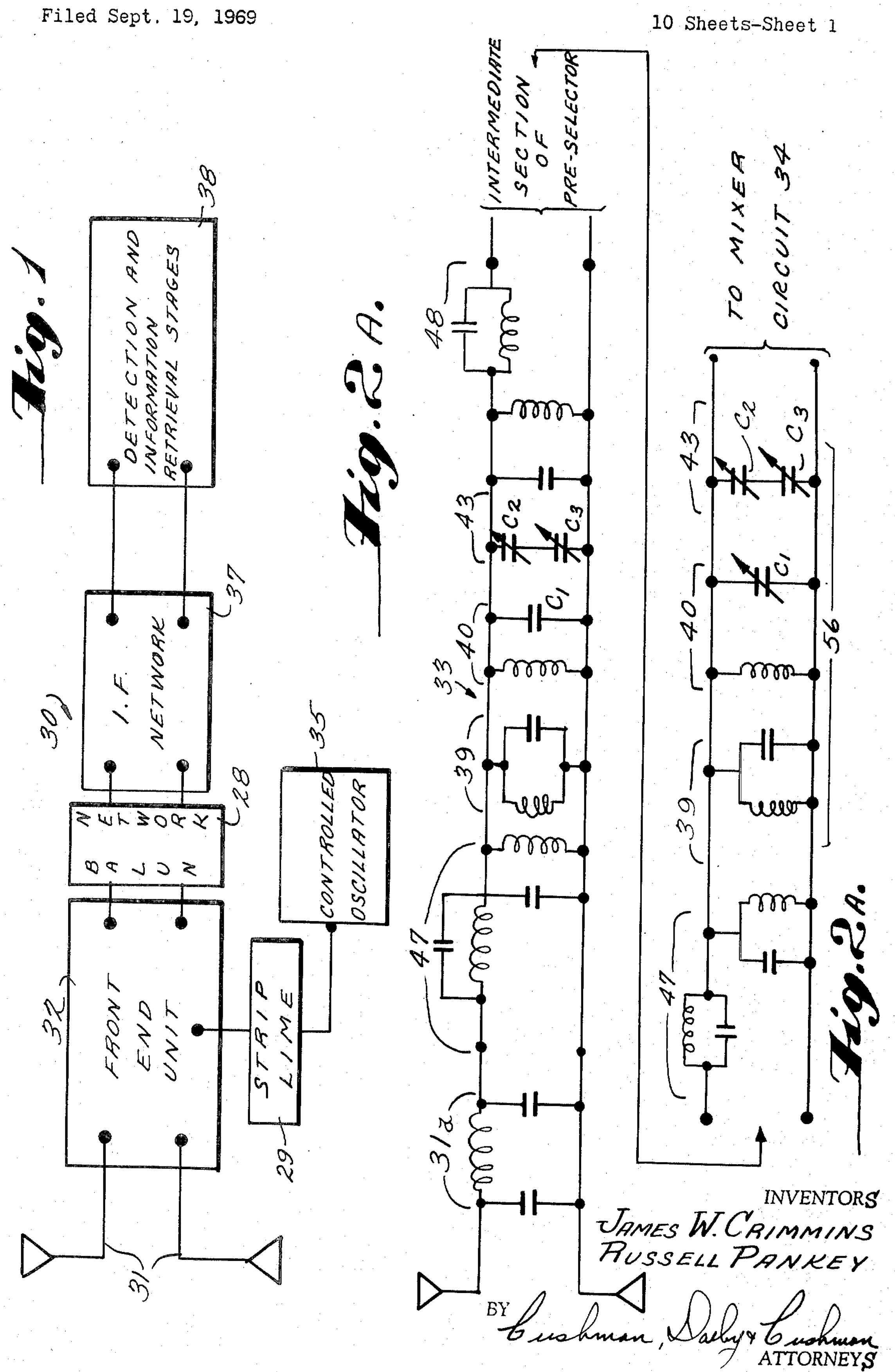
FIG. 1 is a block diagram of a microwave receiver, that includes a front end unit constructed in accordance with the present invention.
FIG. 2A is a schematic diagram of the preselector filter of the aforesaid front end unit.

Referring to FIG. 1, microwave receiver 30 includes an antenna 31 for intercepting R.F. microwave energy and for coupling it through the network 31*a* shown in FIG. 2A of the front end unit 32 of the receiver 30. The front end unit 32 also includes a preselector filter 33 (FIG. 2A) and a mixer circuit 34 (FIG. 2A) serially connected to it. Local oscillator power is supplied to the mixer 34 by means of a variable frequency oscillator 35 which may be crystal controlled, driving a multiplier circuit 36 (FIG. 2C) via a strip line 29. As shown, the output of the multiplier circuit 36, which may or may not be part of the front end unit 32, is coupled to the mixer 34.

The output of the mixer circuit 34 constitutes a microwave I.F. signal that is coupled via a conventional Balun network 28 to an I.F. amplification network 37 comprised of one or more preamplifier and amplifier sections. The output of amplification network 37 in turn is coupled to the signal detection and information retrieval stages 38 of the receiver 30 which then process the I.F. signal to recover the information component encoded therein.

Figure 3:
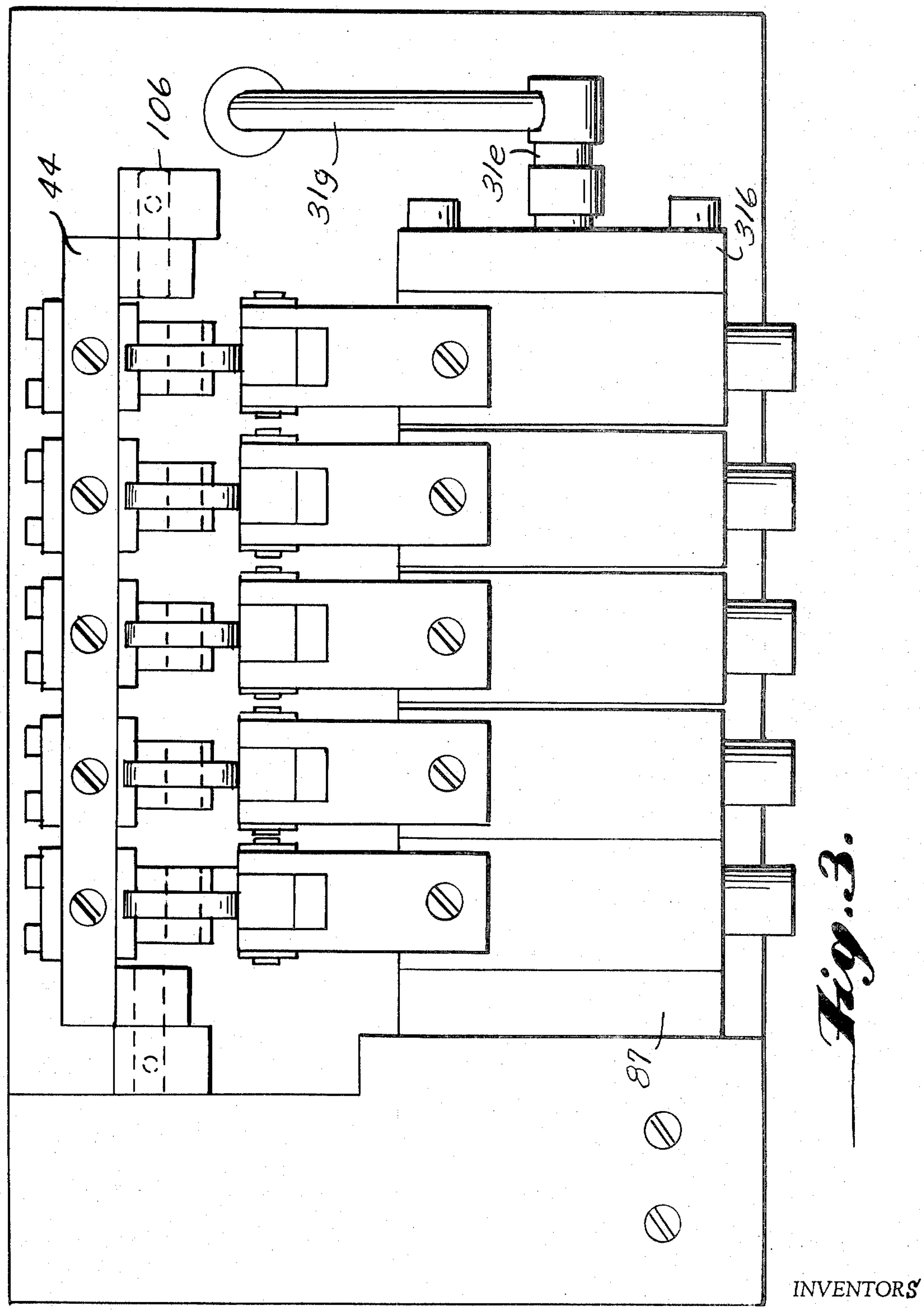
FIG. 3 is a side elevation view of one embodiment of a front end unit constructed in accordance with the invention.

The above-described receiver 30 can be viewed as a conventional L-band or S-band microwave receiver 30, except for the front end unit 32 incorporated therein and constructed in accordance with the invention and accordingly only the novel front end 32 is described in detail below. In one embodiment of this invention described below, the front end unit 32 first includes an input stage 31*b* for coupling R.F. microwave energy to a preselector filter 33. This input stage 31*b* (FIG. 8) includes a mounting block 31*c* into which a circular member 31*d* is inserted. The member 31*d* includes a coaxial transmission line 31*e* electrically connected to an L-shaped probe 31*f* that directly couples R.F. energy into the first section of the preselector filter 33. The coaxial transmission line 31*e* is coupled to the antenna 31 by means of a cylindrical coaxial link 31*g* (FIG. 3).

Figures 6, 7, 13:
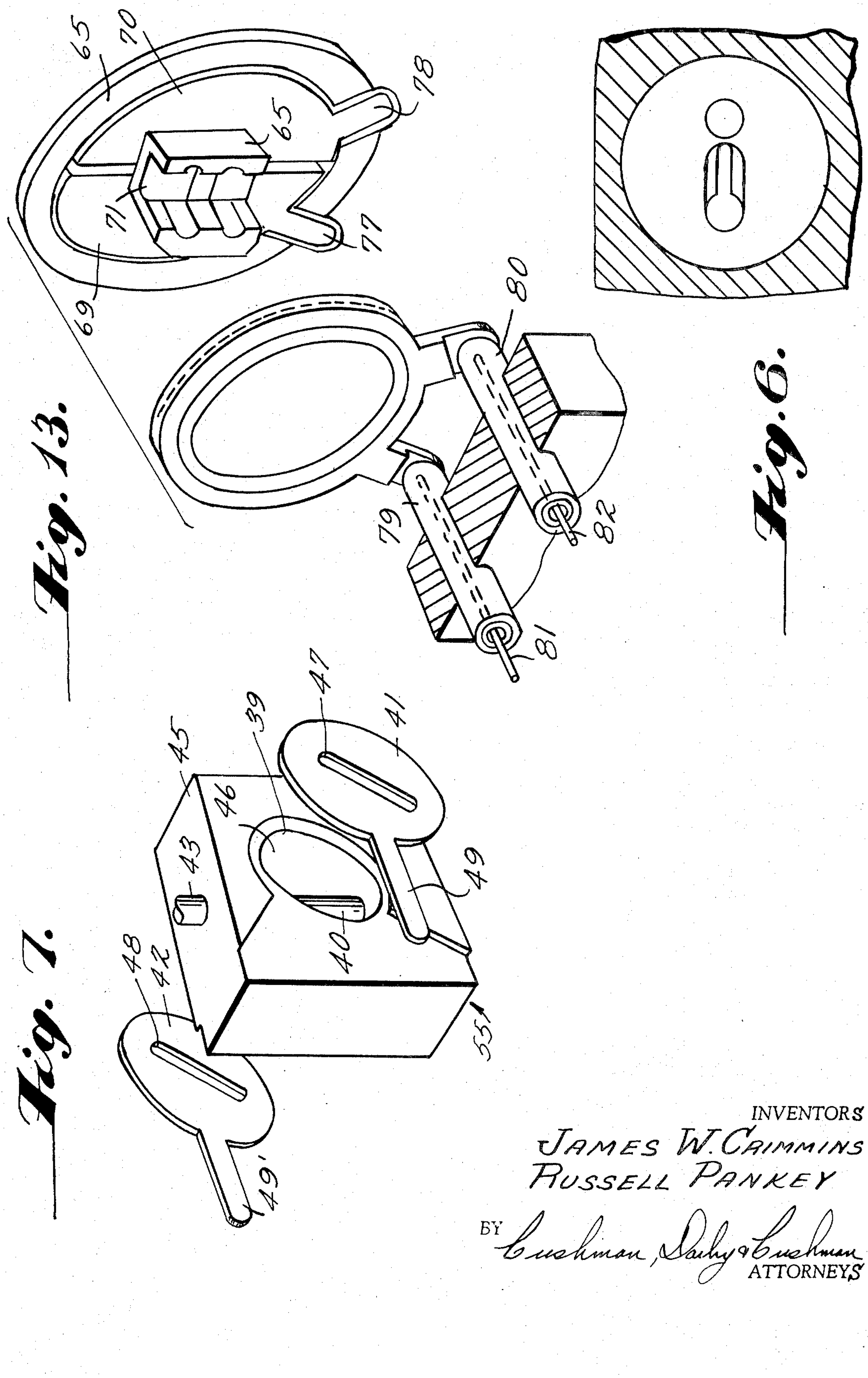
FIG. 6 is another sectional view of the same portion of the front end unit, taken along the line 6—6 in FIG. 4.
FIG. 7 is a perspective view of a typical modular cavity unit and rotatable iris end walls incorporated in the preselector filter.
FIG. 13 is an exploded perspective view of the output section of the mixer circuit.

The preselector filter 33 itself is comprised of a plurality of cylindrical resonant cavities 39 (FIG. 7), each having a hollow conducting post 40 mounted in the cavity transverse to the longitudinal axis thereof. In addition, each cavity 39 has a first end wall comprised of a rotatable apertured plate 41 for coupling signal into the cavity and a second end wall comprised of a second apertured plate 42 for coupling signal out of the cavity. Further, each cylindrical cavity 39 has associated therewith a tuning rod 43 which electrically cooperates with the transverse conductor 40 and which is mechanically moved inside the hollow conductor 40 by a mechanism 44, as more fully described below.

Each cylindrical cavity 39 in the preselector filter 33 is identically formed out of a cavity block 45 that encloses a cylindrical volume 46 whose resonant frequency is substantially greater than any frequency of interest in the band width of the preselector filter 33. The enclosed cylindrical volume 46 is closed at each end by apertured plates 41 and 42 which have centrally located generally rectangular apertures, or irises, 47 and 48. The plates 41 and 42 each have a tab 49 and 49' respectively thereon for rotating the plates and hence for rotating the irises 47 and 48 with respect to the cavity. Rotation of any given iris causes a variation in the mutual coupling between adjacent cylindrical cavities 46 in the preselector filter 33 that share that iris plate as a common wall. This rotation can then be employed to shape the skirts and pass band characteristics of each cylindrical cavity 39 in the preselector filter 33, and hence to shape the band pass characteristic of the entire filter 33.

Figures 8, 15:
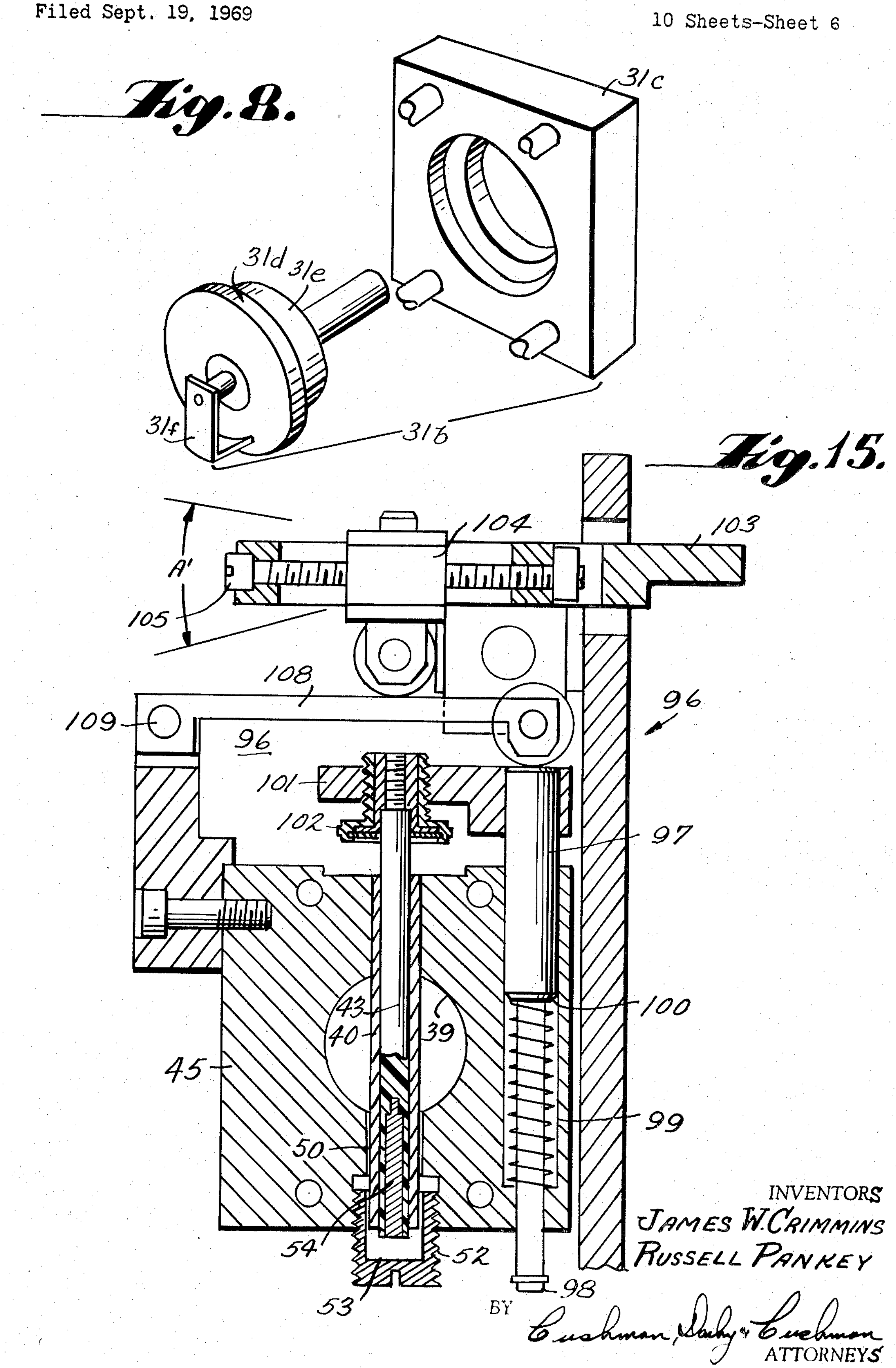
FIG. 8 is a perspective view of the R.F. input stage of the front end unit.
FIG. 15 is a front elevation sectional view taken along the line 15—15 in FIG. 4, showing details of the construction of a typical cavity and tuning apparatus thereof.

As shown in FIG. 15, the conductor or post 40 mounted in each cavity 46 is oriented inside the cylindrical cavity volume 46 and is mounted transverse to the longitudinal axis of the cylindrical cavity 39. One end of the post 40 is electrically connected to the wall of the cylindrical cavity 46 while the other end of the post 40 is oriented inside a hole 50 at one end of the cavity block 45. The length of the wall of hole 50 is extended by means of the interior wall 52 of a hollow member 53 that is threaded into the cavity block 45.

In electrical effect, the post 40 is equivalent to an inductance having one end connected to the cavity wall, or reference potential. The unsupported end of the post 40 then constitutes the other end of the equivalent inductance which then effectively shunts the cavity which itself is electrically equivalent to a resonant "tank." Further, the unsupported end of the post 40 approaches the wall of the hole 50, thereby also forming a capacitance $C_1$ between the post end and the cavity wall or reference potential; consequently, the resonant frequency of the cavity is thereby lowered, and in particular, is lowered to a value selected to be slightly greater than the highest frequency in the pass band of the preselector filter 33. This new and lower resonant frequency varies inversely with respect to the length of the post 40, measured from the cavity end of the hole 50, out of the cavity block 45, and consequently, the resultant structure of cylindrical cavity 39 and transverse tuning conductor 40 can be used to construct a filter for operation at any portion of the L-band or S-band.

The resonant frequency of each cavity 39 is then adjusted to the desired frequency band of filter operation by inserting a plastic rod 43 concentrically through the post 40 out into the hole 50; the rod 43 has a slug 54 of metal, for example, brass, inserted in one end thereof. In electrical effect, two serially connected capacitors $C_2$ and $C_3$, as shown in FIG. 2A, are developed by the rod 43; the first capacitor $C_2$ exists between inner wall of the post 40 and the metal slug 54 and the second capacitor $C_3$ exists between the metal slug 54 and the wall of the hole 50 (which is electrically at the same potential as the wall of the cavity, that is, reference potential). Capacitors $C_2$ and $C_3$ are in serial connection and shunt the fixed capacitance of the post 40 (FIG. 2A). This serial capacitance is variable, and is varied by moving the rod 43 in and out of the region defined by the extended wall of the hole 50.

Since the capacitance of parameter $C_2$ decreases as the capacitance of parameter $C_3$ increases, as "S" characteristic (FIG. 2D) of total capacitance $$C_T(C_T=C_2+C_3)$$

versus rod 43 motion is obtained, and provides a roughly linear range (A) for filter operation. Tuning of the plurality of cavities 39, that comprise the preselector filter 33, by means of a plurality of tuning rods 43, is effected in a gang-tuned manner by a tuning mechanism 44 described in more detail below.

The preselector filter 33 is constructed by use of one or more modular units 55 (FIG. 7) and in FIG. 2A, two such units 55 are shown comprising filter 33. Each unit 55 is comprised of the above-described cylindrical cavity 39, a transverse conductor 40, and a transverse tuning rod 43 and each modular unit 55 has the same resonant frequency, which is ultimately fixed by adjustment of the rods 43, and each constitutes a section in the multistage preselector filter 33. The overall transmission characteristic of the preselector filter 33, i.e. the filter band width and skirt shape, on the other hand is selected by rotation of the iris plates 41 and 42 associated with each modular unit 55. Each iris plate 41 and 42 constitutes a common wall that is shared by adjacent cylindrical cavities 39, and hence, rotation of the iris causes a variation in the mutual coupling between those adjacent cavities, thereby shaping the transmission characteristic of the preselector filter 33.

Figures 4, 5:
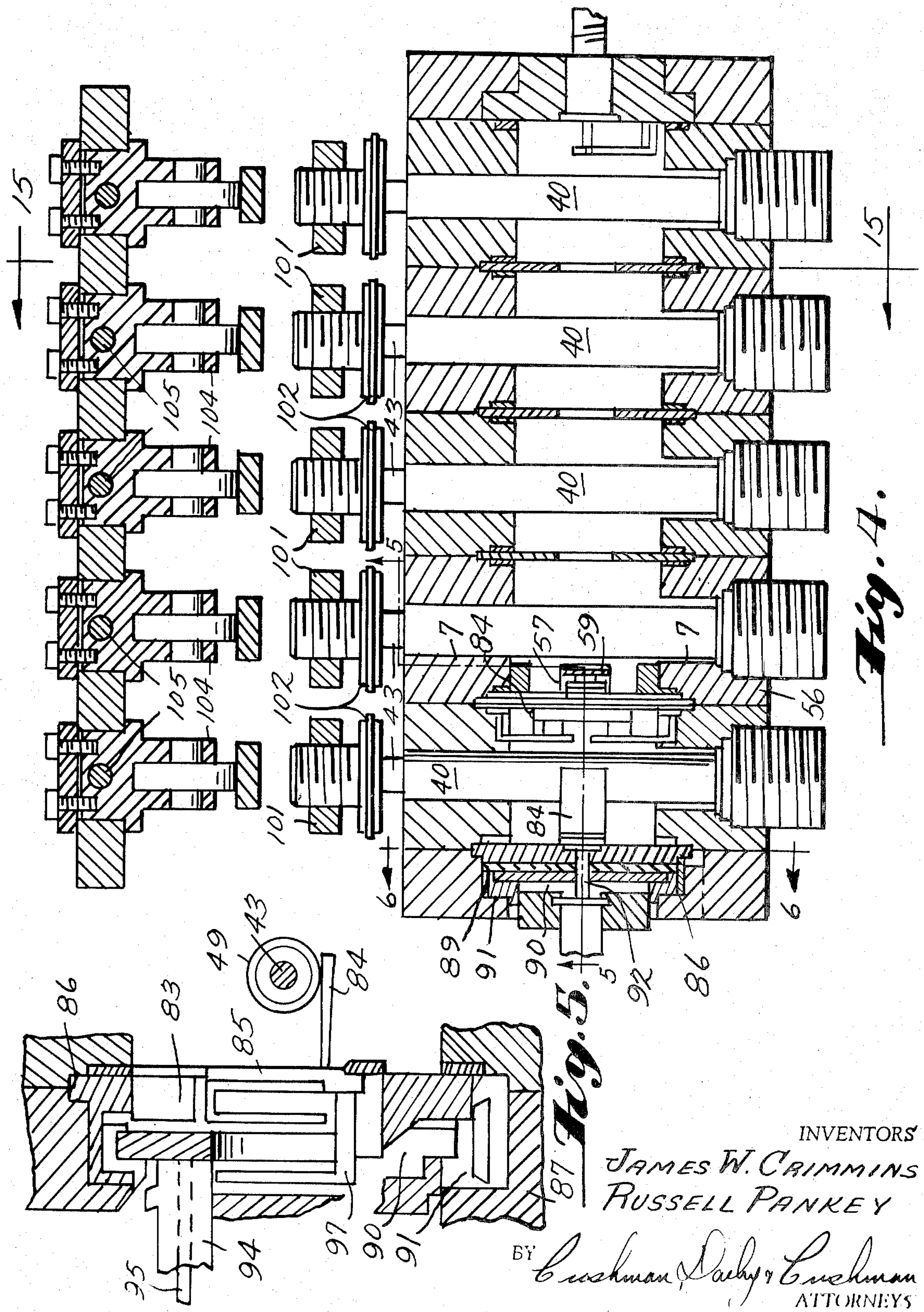
FIG. 4 is a side elevation sectional view of the embodiment of FIG. 3 taken along the section line 4—4 in FIG. 16.
FIG. 5 is a sectional view of the local oscillator input apparatus, taken along the line 5—5 in FIG. 4.

In a typical front end unit 32, constructed in accordance with the invention, the last cavity 56 of the preselector filter 33 is coupled to the signal port 57 of the mixer section 34 by means of a variable capacitor 58 which has a very low self-inductance. The capacitor 58 comprises a rotatable vane 59 mounted on a plastic (Rexolite) cylinder 60 (see FIGS. 4 and 11). The vane 59 is oriented in a plane parallel to the plane of the transverse conductor 40 in the last cavity 56 of the filter, and rotation of the vane 59 is accomplished by means of a pick inserted through a hole in the block 56 to contact the plastic cylinder 60. The vane 59 comprises a thin longitudinally extending sheet of metal and, consequently, rotation of the vane 59 in its plane varies the capacitive coupling between the post 40 in the last cavity 56 of the preselector filter 33 and the vane 59; in effect, the structure is electrically equivalent to a variable capacitor. The center of this vane 59 is in electrical contact with the threaded end of post 72.

Figures 11, 12, 14:
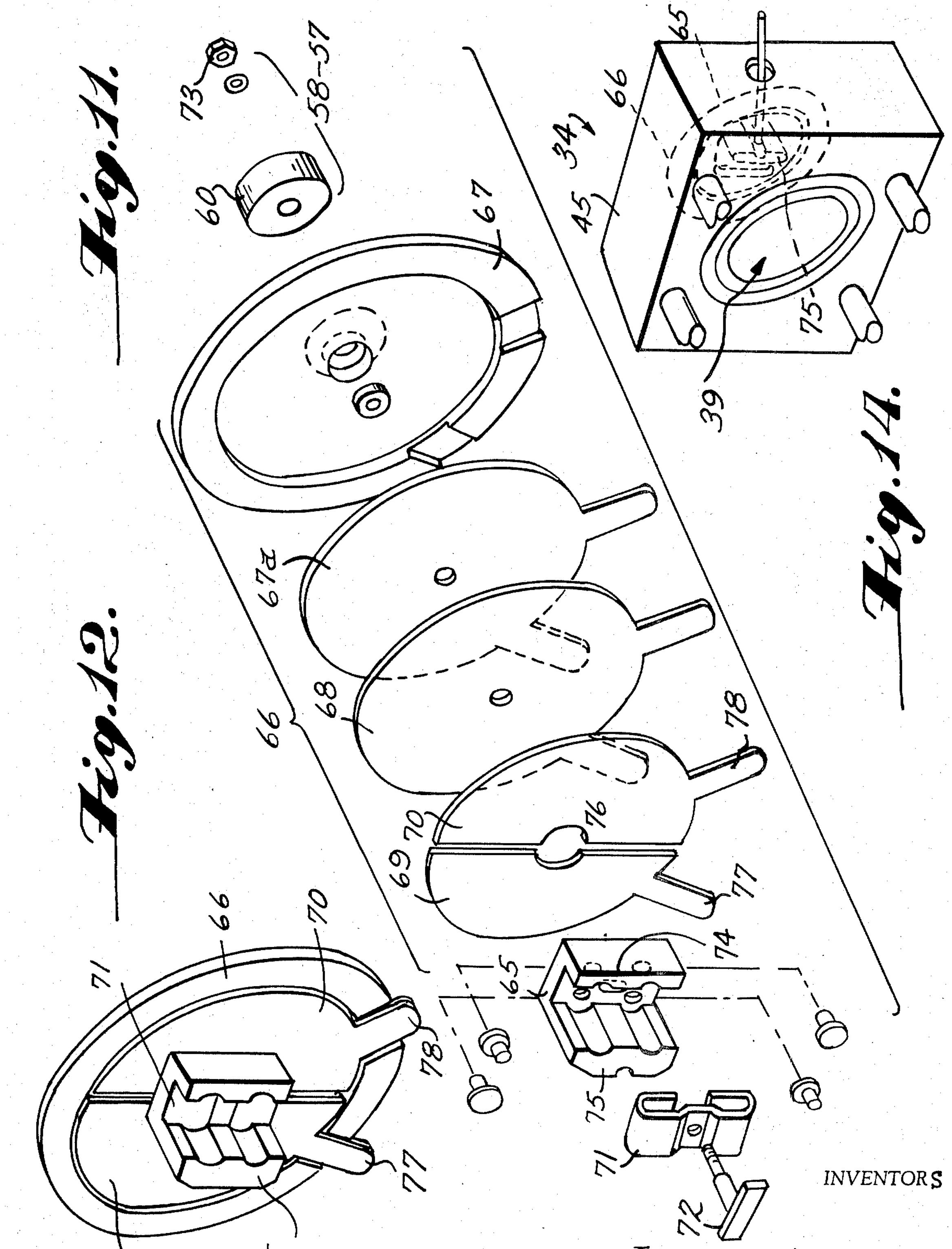
FIG. 11 is an exploded perspective view of the mixer circuit.
FIG. 12 is a perspective view of the mixer circuit assembly.
FIG. 14 is a perspective view of the mixer stage, showing the manner in which the mixer circuit can be adjusted to attain balance.
Figure 16:
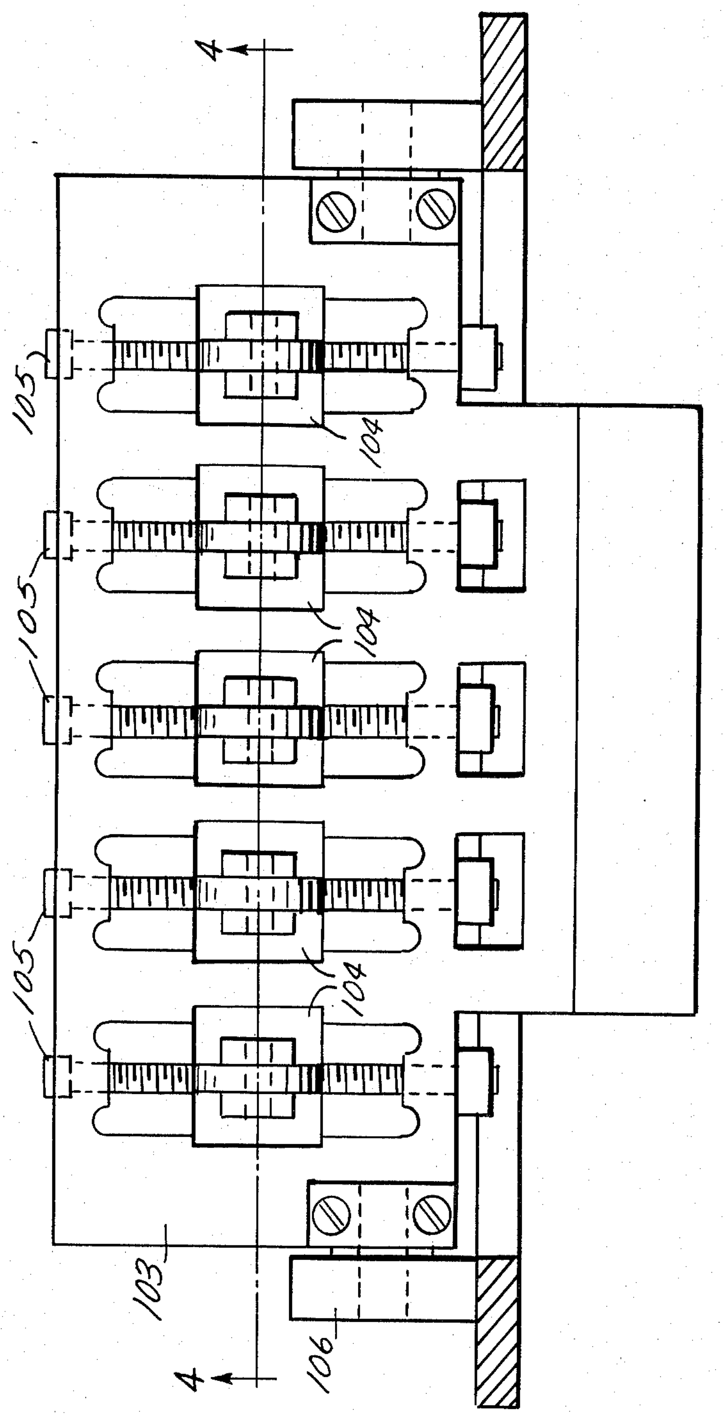
FIG. 16 is a plan view of the front end unit shown in FIG. 3, particularly illustrating a portion of the apparatus used for simultaneously tuning the preselector filter.

As shown in FIG. 14, mixer section 34 comprises a transverse cylindrical cavity 39 constructed and tuned in the same manner and electrically identical to the cavity sections of the preselector filter 33. The mixer section 34 also includes a double-balanced mixer circuit comprised of four diodes electrically connected in a lattice configuration and mounted on the end wall of the mixer cavity and thus oriented inside the cavity.

Figure 2B:
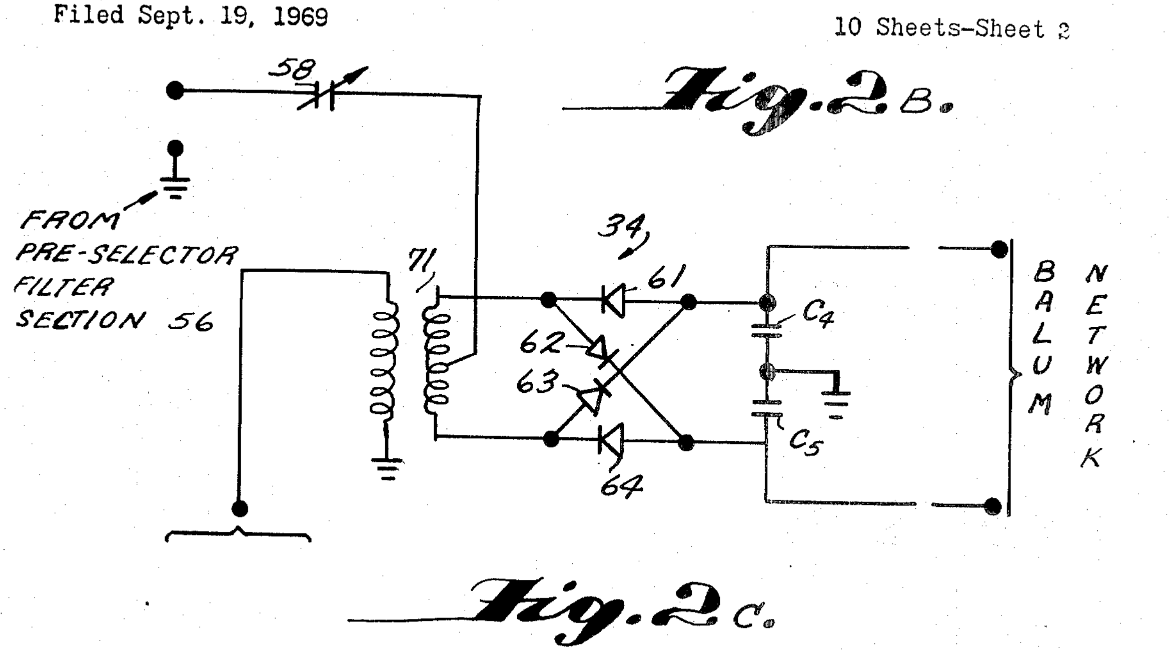
FIG. 2B is a schematic diagram of the mixer section in the aforesaid front end unit.

The mixer diodes 61, 62, 63 and 64 are mounted in an elongated U-shaped plastic member 65 (FIG. 11). The mounting member 65 is secured to a circular plate 66 that comprises a metal base plate 67 extending into the cavity 56 and a metal wafer **67*a* in register therewith. A dielectric wafer 68 overlies the wafer 67*a* and extends further into the mixer cavity while semicircular metal plates 69 and 70 overlie the dielectric member 68. Each metal plate 69 and 70 forms a capacitor with the base plate 67** (capacitors $C_4$ and $C_5$ shown in FIG. 2B).

A C-shaped spring-vane 71 is secured in place on member 65 by post 72 which extends through the mounting member 65 and circular plate 66 into the cavity 39. The vane 71 serves as an input transformer and electrically contacts all four diodes of the mixer circuit and forces the diodes and the diode mounting member 65 against the circular plate 66. A nut 73 is threaded onto the post 72 and holds the components of capacitor 58 against the plate 66. The plastic member 65 is oriented on the capacitor plates 69 and 70 in such manner that two of the four diodes electrically contact one plate 69, and the other two diodes electrically contact the plate 70.

The mounting member 65 has an elongated slot 74 therein (see FIG. 11) through which the post 72 extends. A second slot 75 is placed at the outer central portion of the plastic member 65 and a suitably designed pick can be inserted through the mixer cavity block (FIG. 14) into the cavity to contact the mounting member 65 at the slot 75. Consequently, the mounting member 65 can be moved parallel to the circular diameter 76 that separates the circular metal plates 69 and 70. By moving the mounting member 65, the mixer diode configuration is electrically moved along the inner wall of the vane 71, thereby trimming the input transformer to the mixer circuit 34. Trimming of the mixer diode configuration in this manner effectively isolates the source 36 of local oscillator energy from the preceding sections of the preselector filter 33 and antenna terminals 31 of the receiver 30 and consequently, no local oscillator energy can be coupled out of the mixer section 34.

Figure 17:
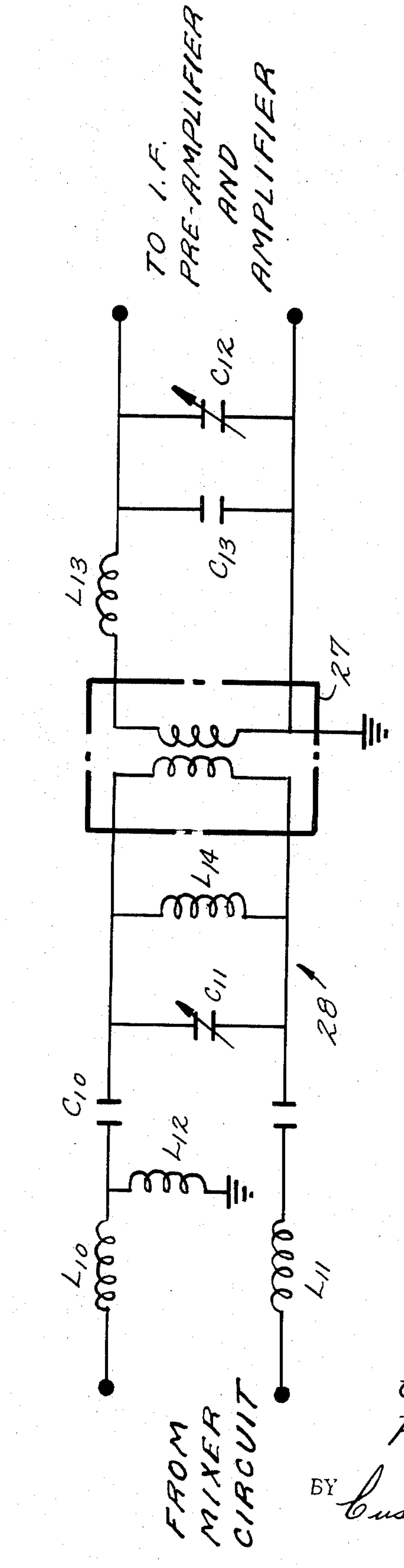
FIG. 17 is a circuit diagram for a Balun network.

Semicircular metal plates 69 and 70 have tabs 77 and 78, respectively, for coupling I.F. output signals from the mixer section 34 to the Balun network 28 (FIG. 17). This coupling is achieved (FIG. 13) by the use of hollow elongated plastic rods 79 and 80 that extend through the rear end of the front end unit. Cylindrical conducting members 81 and 82, respectively, extend through the hollow rods 79 and 80 to electrically contact the tabs 77 and 78.

Balun network 28 as shown in FIG. 17 includes a double tuned LC circuit comprised of inductance $L_{14}$, capacitor $C_{10}$ and capacitor $C_{11}$, as well as inductance $L_{13}$, capacitance $C_{12}$ and capacitance $C_{13}$. The two sections of the passive network are coupled by means of a transformer 27. Inductances $L_{10}$, $L_{11}$ and $L_{12}$ represent the inductance of the posts 40 of the last unit 55. The network 28 merely serves to convert the balanced output of the mixer 34 to an unbalanced input to network 37 and may or may not be a part of the front end unit 32.

Figures 9, 10:
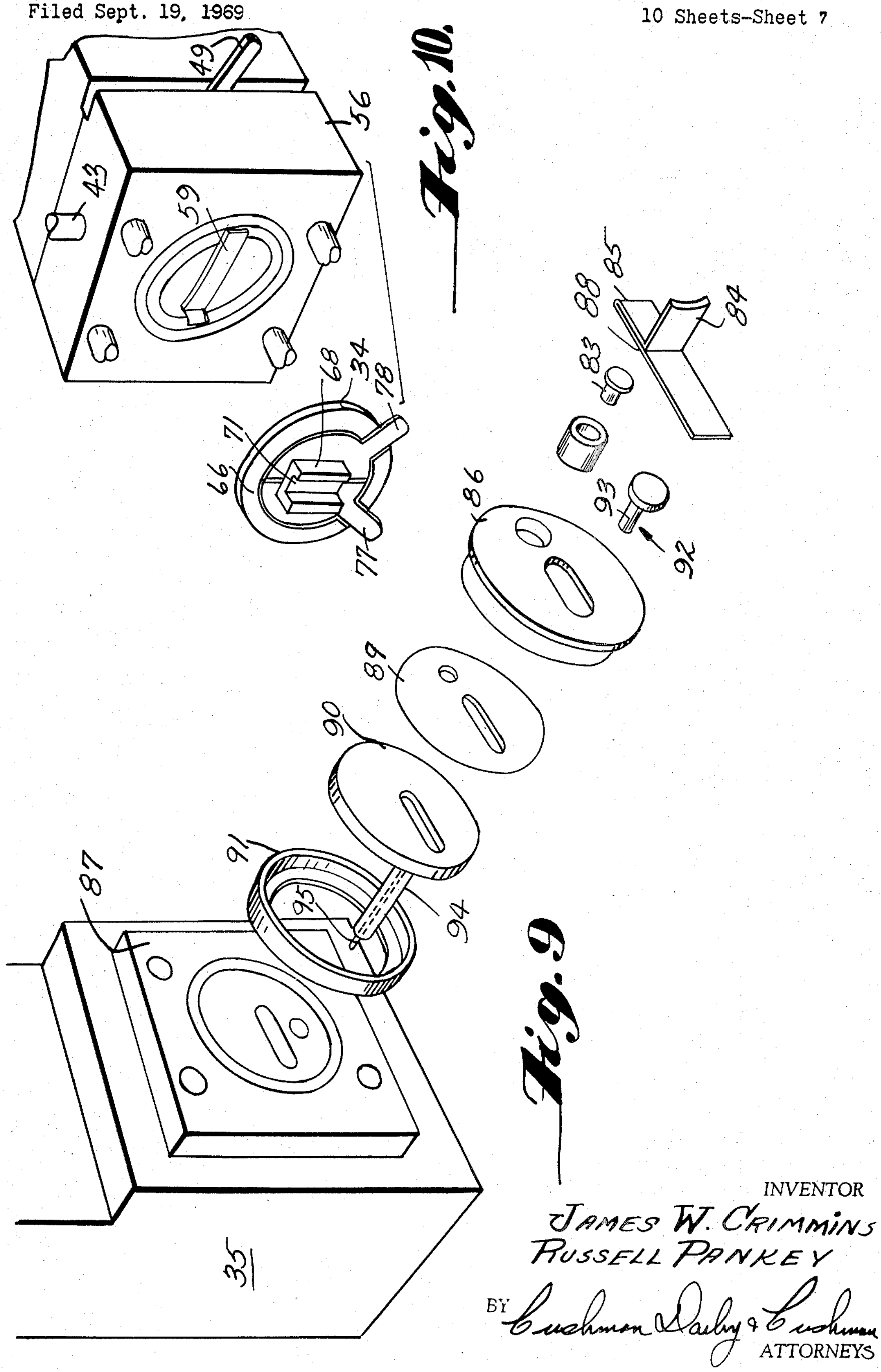
FIG. 9 is an exploded perspective view of the local oscillator coupling apparatus in the last stage of the front end unit.
FIG. 10 is a perspective view of a portion of the mixer circuit apparatus in the front end unit.

A multiplier circuit 36 is mounted on the other end wall of the mixer 34 cavity (FIG. 9). The multiplier circuit 36 includes a snap-action diode 83 having an input capacitance represented by $C_6$ in FIG. 2C and electrically connected to the crystal-controlled local oscillator 35 via a strip line 29. Also included within the oscillator 35 may be conventional direct current generators, amplifiers, multipliers, impedance matching networks and other suitable circuits. The diode 83 serves electrically as a harmonic generator and in an L-band front end unit 32, the fifth harmonic output of the diode 83 is utilized, while in an S-band front end unit, the seventh harmonic output of the diode 83 is utilized. The harmonic output of the diode 83 is directly coupled into the mixer cavity by means of a conducting tab 84 electrically contacting the last transverse post 40 of the mixer cavity.

Referring to FIG. 9, the conducting tab 84 is an integral extension of the flat rectangular plate 85 which is secured to a cylindrical pillbox 86 whose interior volume is oriented into the cavity of the end plate section 87 of the front end unit 32. The snap-action diode 83 is inserted through an aperture in the rear wall of the pillbox plate 86 and is in electrical contact with the wall 88 of the plate 85. A dielectric wafer 89, for example, made of Teflon in a circular shape, is inserted into the pillbox 86 volume. A metal plate 90 overlies the dielectric member 89 and is in registration therewith to form a capacitor ($C_6$ in FIG. 2C) between the rear wall of the pillbox plate 86 and the metal plate 90. One terminal of this capacitor $C_6$ is in contact with the anode of the diode 83 while the other terminal of the capacitor $C_6$ is connected to reference potential. A cylindrical metal ring 91 is inserted into the pillbox 86 volume, and holds the assembly together. A metal member 92 having an integral extending tab portion 93 is in electrical contact with the metal plate 85 and can be moved back and forth along the surface of the plate 85 by means of a suitable pick inserted through the wall of the end block 87 of the front end unit.

Figure 2C:
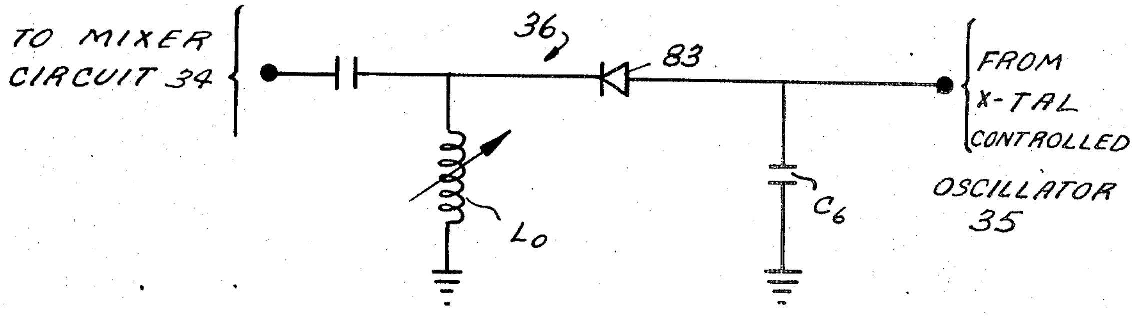
FIG. 2C is a schematic diagram of the multiplier circuit in the aforesaid front end unit.

This metal tab 83 serves as an inductance ($L_0$) that has one terminal at ground potential and the other terminal connected to the cathode of the snap-action diode 83 (FIG. 2C). The variable industance $L_0$ and the very small capacitance $C_6$ (on the order of 30 picofarads) serve to enable proper tuning of the desired harmonic output of the snap-action diode 83.

The output of the crystal-controlled oscillator 35 via strip line 29 is coupled to the anode of the snap-action diode 83 by means of a hollow plastic rod 94 that extends through the end plate 87 of the front end unit and has a cylindrical conducting member 95 extending through the interior thereof, electrically to contact the diode 83.

Referring to FIG. 15, a tuning mechanism 96 is used to gang-tune the cylindrical cavities 39 of the preselector filter 33 by moving the tuning rods 43 in and out of the cylindrical transverse posts 40.

Each cavity block 45 has a cylindrical member 97 slidably journalled therein so that each cylindrical member 97 includes a depending external flange stop 98 which extends out of block 45. A spring 99, mounted inside the block 45, is compressed by an internal shoulder 100 on the cylindrical member 97 when the bracket 101 to which the cylindrical member 97 is secured moves rod 43 into the cavity block 45. A tuning rod 43 is also mounted on the bracket 101 and a zero nut assembly 102 enables the tuning rod 43 to be set at a predetermined zero position with respect to the post 40.

The tuning mechanism 96 also includes a wobble plate assembly 103 which has a plurality of tuning rod-driving members 104 which correspond on a one-to-one basis to the number of tuning rods 43 incorporated in the preselector filter 33. The rod-driving members 104 are each individually adjustable by a screw 105 which moves the member 104 back and forth across the upper surface of a bracket 108.

Figure 2D:
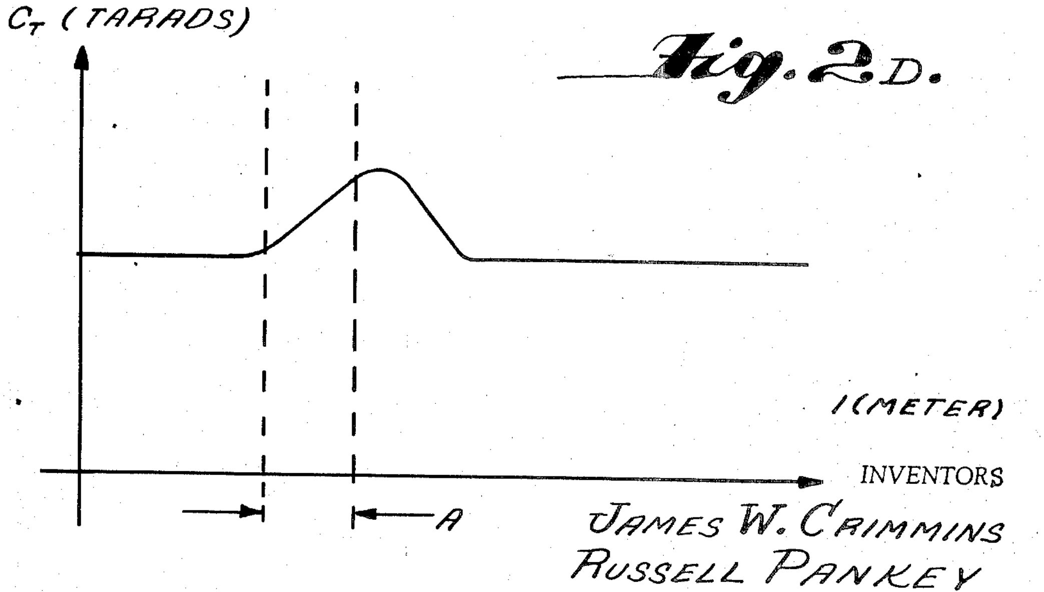
FIG. 2D is a graph showing the relationship between tuning capacitance and the movement of the tuning mechanism incorporated in the preselector filter of the aforesaid front end unit.

The bracket 108 is pivotally mounted to the side of block 45 at fulcrum 109. The position of the members 104 with respect to bracket 108, determined by a setting of screw 105, fixes the maximum distance of travel of the rod 43 into the post 40. The zero nut 102 setting and the setting of screw 105 determine the end points or upper and lower frequency points of the preselector filter 33 transmission band, between which the filter 33 can be tuned. These end points correspond respectively to the end points of the linear region "A" of the total capacitance $C_T$ curve (FIG. 2D). The wobble plate assembly 103 is pivoted at fulcrum 106 (FIG. 3) and can rotate through a desired angle (A', FIG. 15) by activation of a suitable conventional mechanism (not shown).

As the wobble plate assembly 103 rotates, the bracket 108 is rotated through a similar angle, thereby moving member 97 into and out of the block 45. In either case, the tuning rods 43 are simultaneously moved into or out of the transverse posts 40.

Rotation of the wobble plate assembly 103 enables the preselector filter to be tuned over the whole frequency band of interest whose end points are set by means of the zero nut 102 and screw 105. In effect, the wobble plate assembly 103 causes the cylindrical cavity's resonant frequency to be moved back and forth across the frequency band of interest without varying the Q of the cavities.

One embodiment of this invention has been constructed with four modular units 55 with four cavities 39, four conductors 40, and four tuning rods 43, and this embodiment has performed well. While it will be apparent that one of ordinary skill will be able to fabricate the proper elements in the proper dimensions to perform as described above, the following approximate dimensions have been used in the successful embodiment:

Tuning rod 43—Total length 1.75 inches to 1.88 inches, depending upon which unit 55 it is employed within
Length within block 45, 1.45 inches to 1.58 inches
Exterior diameter, .156 inch
Tuning slug 54—Length .5 inch
Outside diameter, .116 inch
Iris plate 41—Length of slot 47, .52 inch
Width of slot 47, .092 inch
Radius of curvature of ends of slot 47, .046 inch
Diameter of plate 41, .867 inch
Width of plate 41, .032 inch
Distance from center of slot 47 to end of tab 49, 1.2 inch
Mixer plate 66—Diameter .865 inch
Block 45—Height (parallel to conductor 40) 1.48 inches
Width, 1.48 inches
Cavity 39—Diameter, .600 inch It will of course be appreciated that these dimensions may be varied somewhat for each individual unit 55.

Although the particular embodiment of the invention has been described as a front end unit for an L-band or an S-band microwave receiver, it is obvious that the front end unit design here disclosed, with appropriate modifications, can be used in any portion of the microwave range of frequencies.

It is also apparent to those skilled in the art that the front end unit here described provides many advantages not obtained by conventional front end units. For example, since direct coupling between resonant cavities is utilized in the preselector filter of the front end unit, the coupling factor between the preselector filter and the mixer section remains constant over the frequency band of interest. Furthermore, the preselector filter here disclosed has the advantage that, by means of the variable iris coupling, the band width and skirt shape of filter transmission characteristics can be altered independently of the resonant tuning of each cavity stage in the filter.

Furthermore, the modular units incorporated in the front end unit have been deesigned from the standpoint of manufacturing economy. Each modular unit consists of a block of metal in which several holes are drilled. Each cavity block is identical to the other except for some minor variations that are accounted for in terms of electrical function by means of the tuning post tuning rod structure, thereby enabling each cylindrical cavity to be tuned to the same frequency of resonance. This tuning effect is complementary to the variable iris coupling between cylindrical cavities. Further, the front end unit constructed in accordance with the invention also possesses many economical manufacturing advantages. For example, the cavity itself is constructed from a block of brass with a number of holes drilled into it and the brass is silver-plated to minimize losses of the microwave energy transmitted through the front end unit.

Moreover, the direct coupling from the preselector filter to the mixer section eliminates mismatching problems encountered in prior art microwave receiver front end units, such as broad band mixers that are matched to coaxial cable. This advantage is obtained by means of coupling between resonant structures. In addition to the freedom from loss due to mismatch, there is also freedom from loss due to the physical transmission line connection since no such connection is used. Furthermore, when direct coupling is used, it is easier to isolate the local oscillator in the front end unit from the preselector filter and antenna terminal input.

Furthermore, use of the particular microwave mixer circuit above described reduces the distance of the current path taken by the local oscillator current around the mixer diode ring; therefore, conversion loss characteristics of the mixer section are improved; for example, intermodulation distortion levels are reduced.

Another advantage of the front end unit constructed in accordance with the invention is that identical cylindrical cavities are used for the preselector filter and for the mixer section, thereby reducing the problems of physically aligning the microwave structure for optimum signal transmission. In addition, the mechanical differences between the cavities are slight and can be compensated for by appropriate adjustment of the tuning mechanism to obtain electrical equivalence. Furthermore, the final tuning of the preselector filter utilizes noncontacting tuning, for example, the tuning post tuning rod structure, hence the electrical tuning noise generated in conventional contact tuning structures is eliminated.

It is to be understood that, while specific embodiments of the invention have been described and shown, many variations in structural detail within the scope of the appended claims are well within the ordinary skill in the art. Accordingly, the invention is intended to be limited only by the scope of the appended claims.

What is claimed is:

1. An improvement for a microwave filter having at least one cylindrical cavity wherein the improvement comprises electrically non-contacting means for tuning the cavity to a preselected resonant frequency and means for varying the transmission band characteristics of said cavity, said tuning means comprising a hollow conducting cylinder mounted in said cavity transverse to the longitudinal axis thereof, an insulating tuning rod mounted inside the inner wall of said hollow cylinder, a slug mounted on one end of said rod, and means for moving said rod in and out of said hollow cylinder; said transmission band varying means including at least one cavity end wall having an energy transmitting iris, said end wall comprising a flat plate, and a leg extending therefrom, rotatable with respect to the fixed spatial orientation of said cavity; the combination being so constructed and arranged that movement of said rod tunes said cavity to a resonant frequency and that rotation of said plate rotates said iris to vary the transmission band charcteristics of said cavity, and wherein said cavity is within a block having a hole of greater diameter than the diameter of said cylinder extending into said block so that said slug is partially within said hole and the portion of said slug within said hole is variable to alter the capacitance between the inner wall of said cylinder and said slug and the capacitance between said slug and the wall of said hole.

2. A filter as in claim 1 wherein said filter includes a plurality of said cavities and a plurality of said tuning and varying means, each in one of said cavities, the further improvement of means for concurrently moving all of said rods to tune said filter.

3. A filter as in claim 1 wherein said cavities are located within aligned blocks and said moving means includes a wobble press plate assembly mounted on said blocks and rotatable about said blocks, bracket means mounted between said plate and said blocks, a plurality of members connected between said rod and said bracket so that the rotation of said wobble plate assembly moves said bracket and said rods to vary the resonant frequency of said filter.

References Cited

UNITED STATES PATENTS

| | | | |
|---|---|---|---|
| 2,527,146 | 10/1950 | Mumford | 333—98 R X |
| 2,541,375 | 2/1951 | Mumford | 333—73 W |
| 2,600,278 | 6/1952 | Smullin | 333—98 R |
| 2,645,679 | 7/1953 | Reade | 333—73 W |
| 2,736,867 | 2/1956 | Montgomery | 333—98 R X |
| 2,949,790 | 8/1960 | Foss | 333—83 R X |
| 2,954,536 | 9/1960 | Müller | 333—83 R X |
| 2,968,771 | 1/1961 | De Loach, Jr. | 333—83 R X |
| 3,074,035 | 1/1963 | Pakan | 333—73 R |
| 3,076,149 | 1/1963 | Knechtli, Jr. | 333—73 W |
| 3,392,354 | 7/1968 | Plutchok | 333—83 R X |

FOREIGN PATENTS

| | | | |
|---|---|---|---|
| 525,122 | 5/1950 | Canada | 333—98 R |

HERMAN KARL SAALBACH, Primary Examiner

W. N. PUNTER, Assistant Examiner

U.S. Cl. X.R.

333—83 R, 73 C, 73 W; 325—445